United States Patent
Toda et al.

(10) Patent No.: US 8,922,832 B2
(45) Date of Patent: Dec. 30, 2014

(54) PRINT PROCESSING METHOD AND INFORMATION PROCESSING APPARATUS IMPLEMENTING THE METHOD

(71) Applicant: Canon Kabushiki Kaisha, Tokyo (JP)

(72) Inventors: Masanari Toda, Yokohama (JP); Satoshi Hirakawa, Kawasaki (JP); Hiroshi Kikuchi, Musashino (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/099,280

(22) Filed: Dec. 6, 2013

(65) Prior Publication Data

US 2014/0098388 A1    Apr. 10, 2014

Related U.S. Application Data

(63) Continuation of application No. 12/237,374, filed on Sep. 24, 2008, now Pat. No. 8,625,125.

(30) Foreign Application Priority Data

Oct. 2, 2007    (JP) .................................. 2007-259238

(51) Int. Cl.
  *G06F 15/00*    (2006.01)
  *H04N 1/40*    (2006.01)
  *G06K 9/34*    (2006.01)
  *G06F 3/12*    (2006.01)
  *G06K 15/02*    (2006.01)

(52) U.S. Cl.
  CPC ............ *G06F 3/1298* (2013.01); *G06F 3/1215* (2013.01); *G06F 3/122* (2013.01); *G06F 3/1244* (2013.01); *G06F 3/1284* (2013.01); *G06K 15/1867* (2013.01)
  USPC ........... 358/1.9; 358/3.28; 358/1.16; 382/178

(58) Field of Classification Search
  None
  See application file for complete search history.

(56) References Cited

U.S. PATENT DOCUMENTS

5,091,967 A * 2/1992 Ohsawa ........................ 382/172
5,550,962 A   8/1996 Nakamura et al.
(Continued)

FOREIGN PATENT DOCUMENTS

JP    2000-215010    8/2000
JP    2001-222395 A    8/2001
(Continued)

OTHER PUBLICATIONS

Office Action Issued in Japanese Patent Application No. 2013-111299 dated Apr. 4, 2014.
(Continued)

*Primary Examiner* — Thomas Lett
(74) *Attorney, Agent, or Firm* — Rossi, Kimms & McDowell LLP

(57)    ABSTRACT

A printer driver for generating print job data to be transferred to a printer in response to a drawing instruction determines, based on combining condition, whether the received drawing instruction can be combined with another drawing instruction. If the printer driver determines that the received drawing instruction can be combined, the printer driver stores the received drawing instruction as intermediate data. If the printer driver determines that the received drawing instruction cannot be combined, the printer driver combines intermediate data of already stored drawing instructions into a single item of print job data and outputs the print job data to the printer. The combining condition is that the received drawing instruction meets all of three conditions.

27 Claims, 15 Drawing Sheets

(56) References Cited

U.S. PATENT DOCUMENTS

2001/0055421 A1   12/2001  Baatz et al.
2005/0001933 A1*  1/2005  Yoshikawa et al. ............ 348/564
2006/0115123 A1*  6/2006  Kanai et al. .................... 382/104

FOREIGN PATENT DOCUMENTS

| | | |
|---|---|---|
| JP | 2001293936 A | 10/2001 |
| JP | 2004-30386 A | 1/2004 |
| JP | 2006065817 A | 3/2006 |

OTHER PUBLICATIONS

Japanese Office Action dated May 11, 2012. Cited in the parent U.S. Appl. No. 12/237,374, filed Sep. 24, 2008.

* cited by examiner

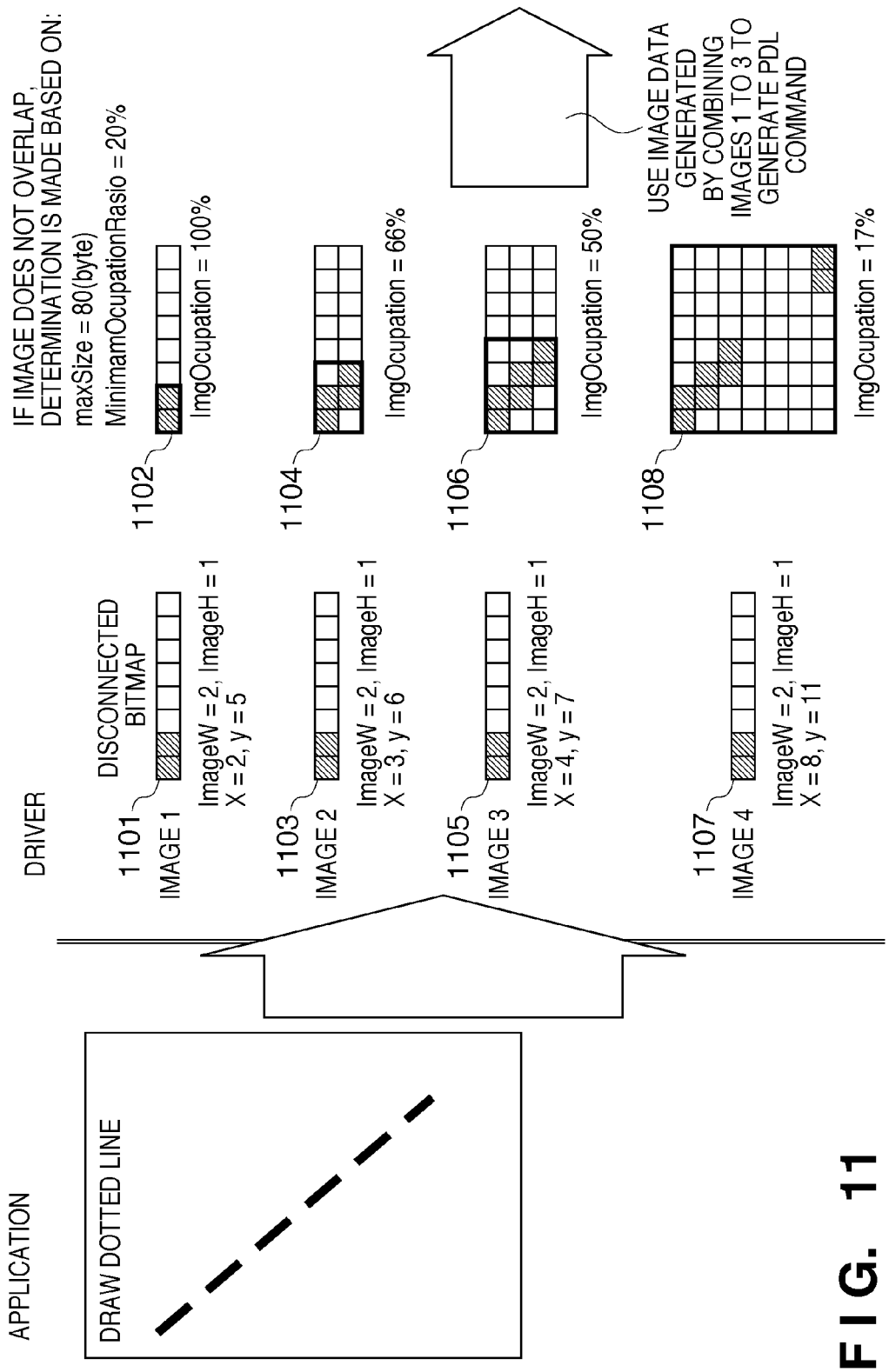
F I G. 11

PRINT PROCESSING METHOD AND INFORMATION PROCESSING APPARATUS IMPLEMENTING THE METHOD

BACKGROUND OF THE INVENTION

1. Field of the Invention

The present invention relates to a print processing method of generating print data to be transmitted to an image output device that outputs image data, and an information processing apparatus that implements the method.

2. Description of the Related Art

In print processing performed by printer drivers for high-function printers, when a drawing instruction is provided from an operating system (OS) to the printer driver, the drawing instruction is replaced with corresponding drawing commands in a page description language before data is transferred to the printer. The Page Description Language will be hereinafter abbreviated as PDL and the method that uses PDL will be referred to as PDL mode. PDL-mode in general has the advantages that it reduces the amounts of data and therefore allows printers to perform processing fast as compared with low-function printers (such as dumb printers, video printers) that do not have PDL and accept only bitmaps as input.

As personal computers become faster and application programs become more sophisticated in functionality, a wider variety of graphical representations are contained in documents such as presentation handouts. Consequently, the amount of data handled in PDL mode is increasing and even high-function printers have become often slower than low-function printers accordingly.

For example, the processing speed of a printer can become slow when objects specified in drawing instructions provided from an OS are small in size but large in number. In such cases, the total throughput can sometimes be increased by rendering the data as a bitmap on the PC, which has a high-power CPU and substantial memory resources, rather than generating PDL drawing commands and transferring the PDL drawing commands to the printer through a network and processing them on the printer.

Therefore, printer drivers provide a mode in which an entire page is rendered into a bitmap and transferred to a printer (hereinafter called raster mode) and allow manual or automatic selection between PDL mode and raster mode. A technique disclosed in Japanese Patent Laid-Open No. 2004-030386 reduces the number of PDL commands by temporarily storing drawing instructions provided from an OS and grouping neighboring drawing instructions into a PDL command in image data form. This technique has prevented reduction of performance by combining the advantages of PDL mode and image mode.

However, the method that provides the raster mode and allows a user to set the raster mode by means of a printer driver does not allow the user to determine whether PDL drawing commands will produce a huge amount of data. Consequently, in many cases, print processing in slow PDL mode is chosen. If the printer driver predicts which of the modes will process each page faster, one page of print data must be held and no print data is sent to the printer while the print data is held, increasing the first printout time. In addition, much PC resources are required.

On the other hand, the method described in Japanese Patent Laid-Open No. 2004-030386 solves the problem by converting only contiguous drawing instruction portions to image data and using PDL commands for the other portions. However, some recent applications use drawing instructions to use small images to draw only individual solid line portions of an apparently dashed line (see FIG. 4) or specify to use small images to draw only black pixels of a larger image (see FIG. 6). Because such disconnected images are not contiguous to one another, the images cannot be combined by using the method described in Japanese Patent Laid-Open No. 2004-030386, remaining to degrade performance.

SUMMARY OF THE INVENTION

The present invention provides a print processing method capable of performing fast and optimum processing of data containing noncontiguous images such as disconnected images and an information processing apparatus that implements the print processing method.

To achieve the object, a print processing method according to the present invention performed by a printer driver of receiving drawing instructions and generating print job data to a printer, comprises the steps of: receiving a drawing instruction; determining whether or not the received drawing instruction can be combined with drawing instructions already stored, based on combining condition; storing the received drawing instruction as intermediate data when it is determined that the received drawing instruction can be combined; and combining intermediate data of the drawing instructions already stored into a single item of print job data and outputting the combined single item of print job data to the printer, when it is determined that the received drawing instruction cannot be combined.

A print processing method according to the present invention of receiving drawing instructions and generating print job data to a printer, comprises the steps of: receiving a drawing instruction; determining whether or not the received drawing instruction should be combined with another drawing instruction; storing the received drawing instruction when it is determined that the received drawing instruction should be combined; and combining drawing instructions already stored in the storing step to create a combined drawing instruction and outputting the combined drawing instruction to the printer when it is determined that the received drawing instruction should not be combined, wherein, in the determining step, it is determined that the received drawing instruction should not be combined when an attribute of the received drawing instruction is the same as an attribute of another drawing instruction and a ratio of an image to an area resulting from combining the received drawing instruction with the another drawing instruction is smaller than a first threshold.

An information processing apparatus according to the present invention including a printer driver for generating print job data to be transferred to a printer in response to a drawing instruction, comprises: a receiving unit adapted to receive a drawing instruction; a determination unit adapted to determine whether or not the received drawing instruction can be combined with drawing instructions already stored, based on combining condition; a storage unit adapted to store the received drawing instruction as intermediate data in a memory when the determination unit determines that the received drawing instruction can be combined; and an output unit adapted to combine intermediate data of the drawing instructions already stored in the memory into a single item of print job data and output the combined single item of print job data to the printer.

An information processing apparatus according to the present invention which generates print job data to printer in response to a drawing instruction, comprises: a receiving unit adapted to receive a drawing instruction; a determination unit adapted to determine whether or not the received drawing instruction should be combined with another drawing instruction; a storage unit adapted to, when it is determined that the received drawing instruction should be combined, store the received drawing instruction; and an output unit adapted to, when it is determined that the received drawing instruction should not be combined, combine drawing instructions already stored by the storage unit to create a combined drawing instruction and output the combined drawing instruction to the printer; wherein the determination unit determines that the received drawing instruction should not be combined when an attribute of the received drawing instruction is the same as an attribute of another drawing instruction and a ratio of an image to an area resulting from combining the received drawing instruction with the another drawing instruction is smaller than a first threshold.

According to the present invention, there is provided a print processing method capable of performing fast and optimum processing of data containing noncontiguous images such as disconnected images and an information processing apparatus that implements the print processing method.

According to the present invention, drawing instructions for drawing portions that locally involve a huge amount of data are sequentially rendered as bitmaps even in PDL mode and then sent to a printer. Drawing instructions for other portions are transferred to the printer as PDL drawing commands.

Consequently, noncontiguous, disconnected images (overlapping or spaced apart) can be combined to reduce the size of PDL commands (reduce the number of headers and improve the data compression ratio by taking advantage of data continuity), thereby reducing the total printing time.

Additionally, by combining and transmitting images one after another, concurrent processing with a printer can be performed and therefore higher performance can be achieved than in image mode in which all data is stored and then transmitted as an image through batch transfer.

Further features of the present invention will become apparent from the following description of exemplary embodiments with reference to the attached drawings (with reference to the attached drawings).

BRIEF DESCRIPTION OF THE DRAWINGS

FIG. 11 is a diagram illustrating a flow of image data when a slope dotted line is composed according to the exemplary embodiment;

DESCRIPTION OF THE EMBODIMENTS

Exemplary embodiments of the present invention will be described with reference to the accompanying drawings.

<Exemplary Configuration of a Print Processing System Including an Information Processing Apparatus According to an Exemplary Embodiment>

Figure 1:
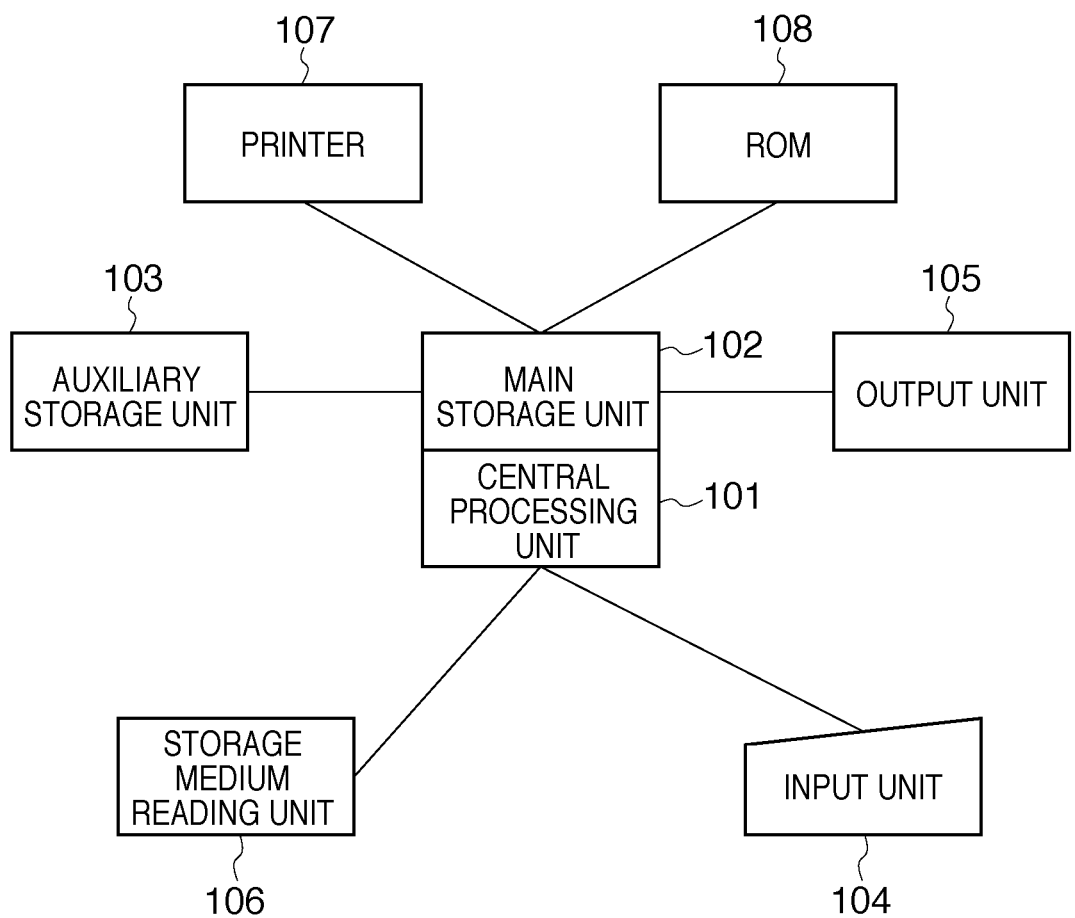
FIG. 1 is a block diagram showing an exemplary configuration of a print processing system to which a print processing method according to an exemplary embodiment of the present invention is applied.

FIG. 1 is a block diagram showing an exemplary configuration of a print processing system to which a print processing method of the present invention is applied.

Reference numeral 101 in FIG. 1 denotes a central processing unit (CPU), which controls the information processing apparatus and the print processing system. The CPU 101 reads a program and data relating to the program from a storage medium such as an FD, CD-ROM, or IC memory card into an auxiliary storage unit 103 through a storage medium reading unit 106 connected to the system. The CPU 101 processes information input from an input unit 104 in accordance with a system program and application program loaded from the auxiliary storage unit 103 into a main storage unit 102 and outputs the processed information to an output unit 105 or a printer 107.

The term output unit 105 as used herein refers to a display unit such as a display monitor, as distinguished from the printer 107, which otherwise would be included in the category of output unit. The input unit 104 includes devices such as keyboard and a pointing device. The auxiliary storage unit 103 may be a hard disk or a magneto-optical disk or a combination of these. These units may be interconnected through a bus or a network, which does not limit the present invention.

Figure 2:
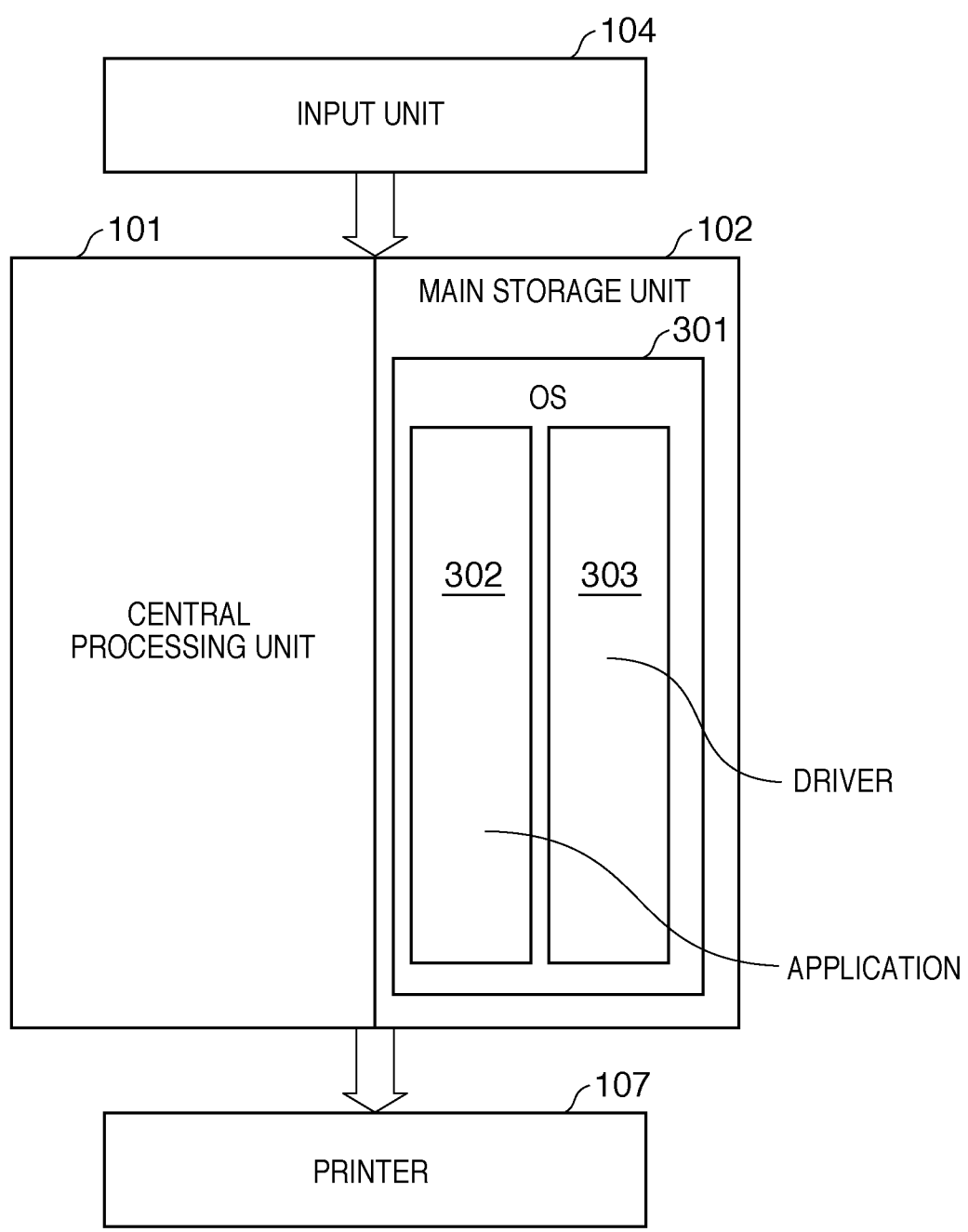
FIG. 2 is a conceptual diagram showing a dataflow in a process from input of a print instruction from an input unit to transmission of data to a printer for printing in the print processing method according to an exemplary embodiment of the present invention.

FIG. 2 is a conceptual diagram illustrating a control program that implements a print processing method of the present invention and a flow of data relating to the control program.

An application 302 and a printer driver 303 function under the control of the CPU 101 according to an OS 301 loaded in the main storage unit 102. In print processing, a print instruction is input from an input unit and print job data is sent to the printer to perform printing.

Although not shown in FIG. 2, reserved in the main storage unit 102 are areas for temporarily storing drawing instructions received, converted intermediate data, and generated PDL commands, a memory buffer 306, which will be described later, a combination memory 308, and areas for storing flags for determining branches in the flowcharts shown in FIGS. 13 to 15 and arithmetic expressions for determining whether processing speed can be increased by combination.

Figure 3:
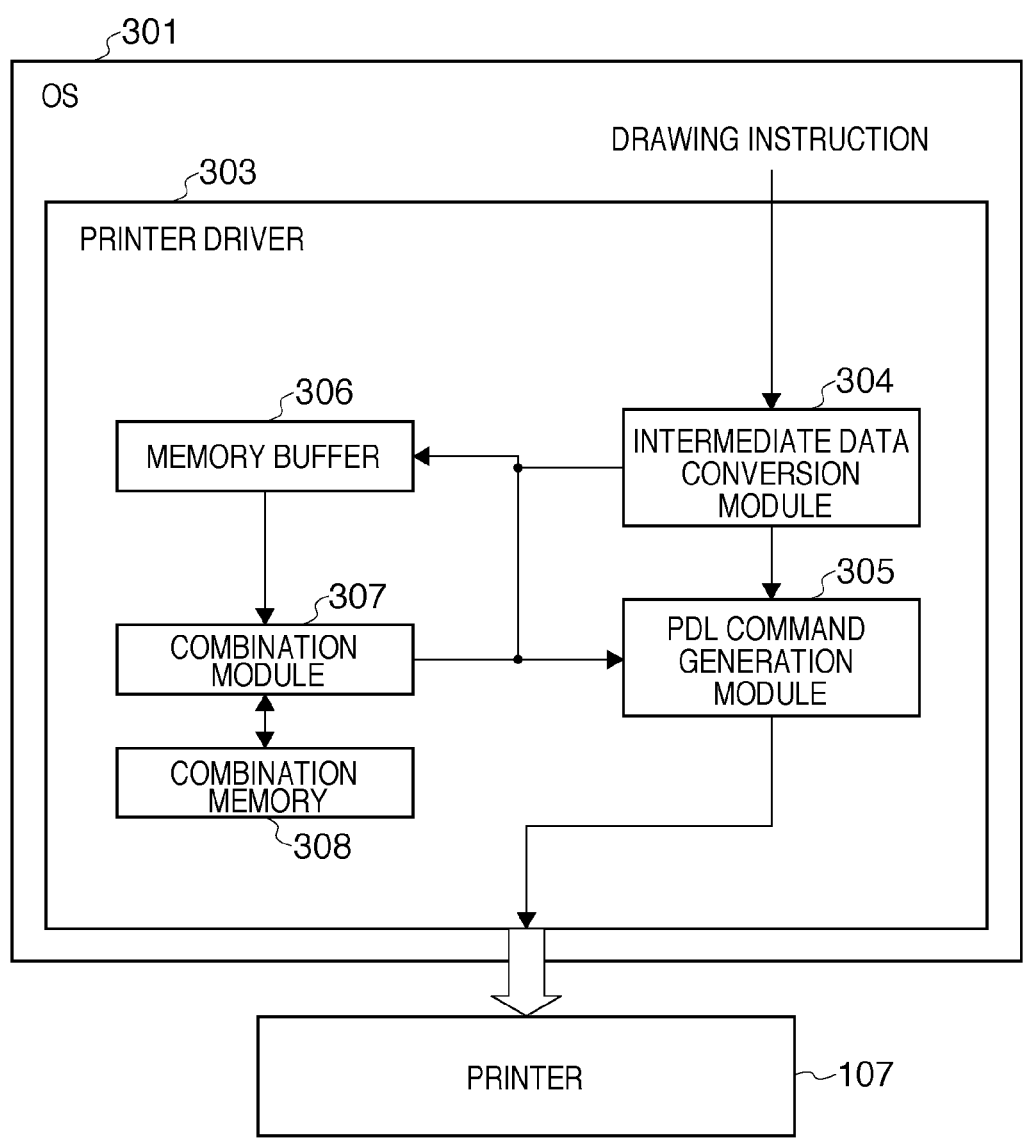
FIG. 3 is a diagram showing in further detail processing performed by a printer driver shown in FIG. 2.

FIG. 3 shows in detail a flow of data processing performed by the printer driver 303 shown in the conceptual diagram of FIG. 2.

The printer driver 303 converts a drawing instruction received from the OS 301 to intermediate data by an intermediate data conversion module 304. At the same time, determination is made as to whether the drawing instruction meets a combining condition, as will be detailed later. If the intermediate data meets the combining condition, information required for drawing is stored in the memory buffer 306. If the intermediate data does not meet the combining condition, the intermediate data is converted to a PDL command at a PDL command generation module 305 and the PDL command is sent to the printer 107.

Intermediate data in the memory buffer 306 is converted to image data at a combination module 307 by using the combination memory 308 if any of the following states occurs while the intermediate data is stored in the memory buffer 306: a drawing instruction that cannot be combined is received; the memory buffer 306 is exhausted; and a drawing instruction for one page has been executed. Image data generated by the combination module 307 is converted to a PDL command by the PDL command generation module 305, and the PDL command is sent to the printer 307.

In this way, drawing instructions from the OS 301 are converted to intermediate data one after another, some of the intermediate data is converted to image data and combined, then converted to PDL commands, and transferred to the printer. Thus processing of drawing instructions from the OS 301 is continued. After processing of all drawing instructions from the OS 301 is completed, the intermediate data in the memory buffer 306 is converted to PDL commands by the process as described above and the PDL commands are transferred to the printer, then the print processing by the printer driver 303 ends.

<Concept of the Print Processing Method in the Print Processing System of the Exemplary Embodiment>

To aid in the understanding of the print processing method of the present invention, differences between a conventional print processing method and the print processing method according to the present invention will be described first with respect to two examples. It will be apparent to those skilled in the art that the present invention is not merely improvements on the techniques in the following two examples but execution of the print processing method of the present invention enables effective processing of images that are not contiguous to one another, such as disconnected images.

(Example of Conventional Processing of a Horizontal Dotted Line)

Figure 4:
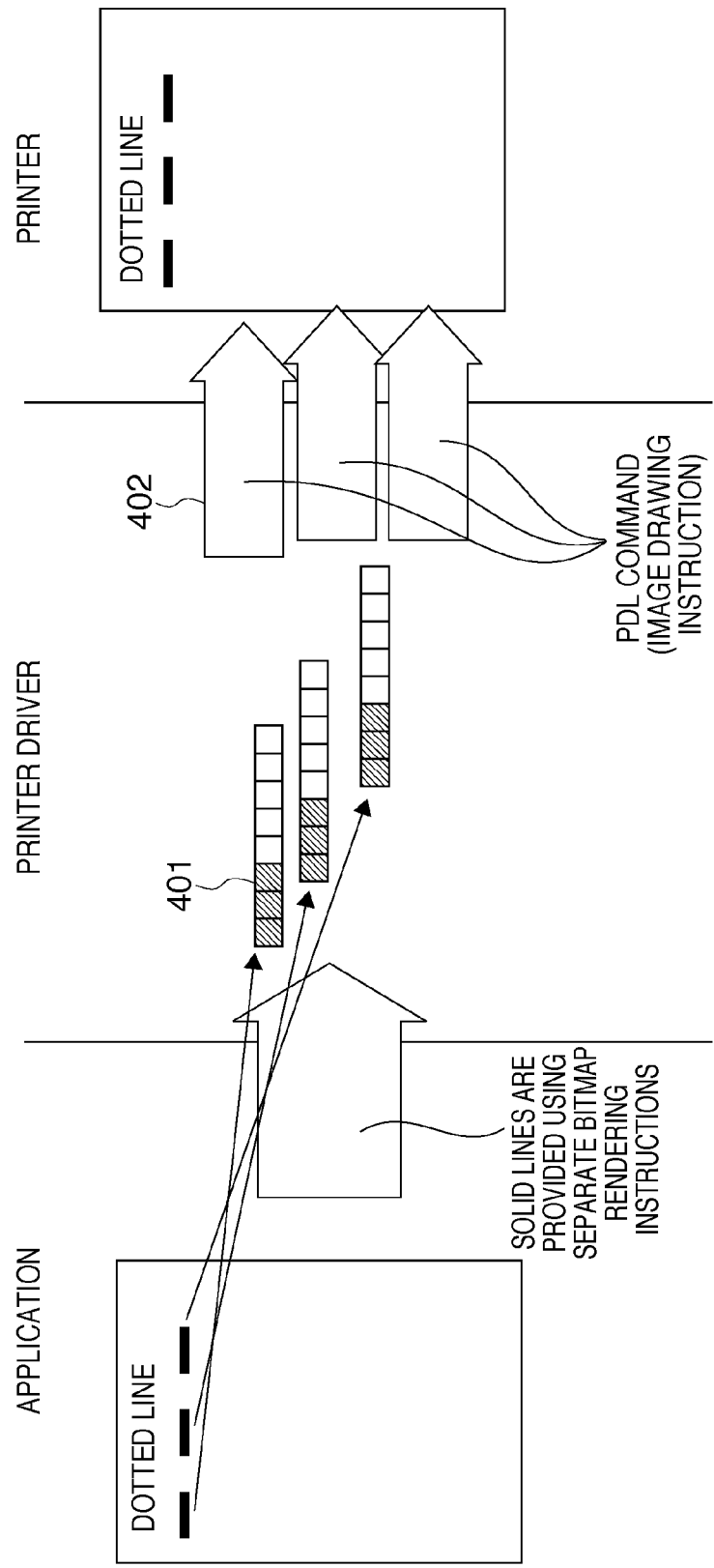
FIG. 4 is a conceptual diagram showing a problem with a conventional image composition method.

FIG. 4 shows an example of a conventional method for printing a horizontal dotted line, which is one example of disconnected images. In the example shown in FIG. 4, the amount of data in rendering using PDL drawing commands is large as compared with the amount of data in bitmap rendering.

When a dotted line is drawing by a typical application, an instruction to draw the dotted line is transferred to a printer driver as one function.

If the application has high-level PDL drawing commands capable of specifying a dotted line, a PDL drawing command of a small size can be used to instruct to draw a dotted line by adding a dotted line attribute to the line drawing instruction.

However, some applications represents a dotted line by using a large number of disconnected images 401 (each with a height of 1 pixel and width of 3 pixels in the example in FIG. 4) of solid line portions of the dotted line. If the printer driver converts image data transferred from an OS to PDL drawing commands, a large number of drawing instructions 402 to drawing disconnected images, each consisting of several bits, are sent to the printer.

When a large number of small image drawing instructions 402 are sent to a printer, the data transfer rate decreases because (1) the ratio of header size in PDL commands increases and (2) compression that uses continuity, such as PackBits compression, does not work well. Furthermore, if a large number of disconnected images are processed on a printer that has a small capability of CPU and small capacity of memory space, much time is required for command analysis, which adds to printing time.

(Example of Processing of a Horizontal Dotted Line According to the Invention)

Figure 5:
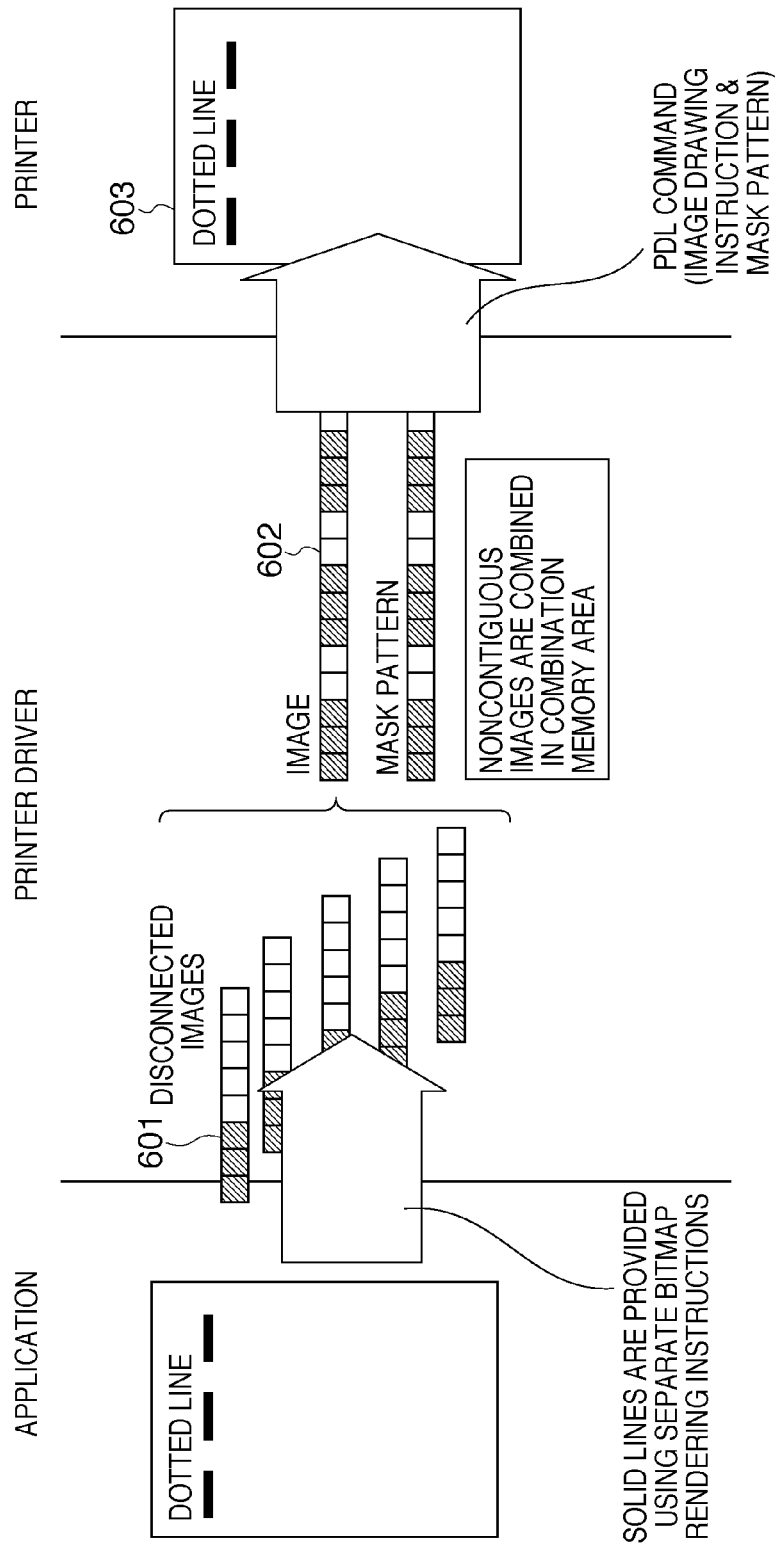
FIG. 5 is a conceptual diagram showing processing according to the present invention that solves the problem with the conventional image composition method shown in FIG. 4.

FIG. 5 shows an example in which a horizontal dotted line, which is one example of disconnected images, is printed according to the present invention. In the example shown in FIG. 5, the same horizontal dotted line as that in FIG. 4 can be drawn with a smaller amount of data in rendering using a PDL drawing command in processing according to the present invention than the amount of data rendered as bitmaps.

According to the present invention, images drawn by drawing instructions that are not contiguous to one another as shown in part 601 of FIG. 5 are combined and converted into an image and a mask as shown in part 602 of FIG. 5 to increase the performance of the whole printing time when it is determined that the whole processing time can be reduced. According to the present invention, unless the amount of combined data exceeds a limit, drawing instructions are combined into a single PDL command and sent to the printer, where the dotted line is drawn as shown in part 603 of FIG. 5.

(Example of Processing of a Slope Dotted Line)

Figure 6:
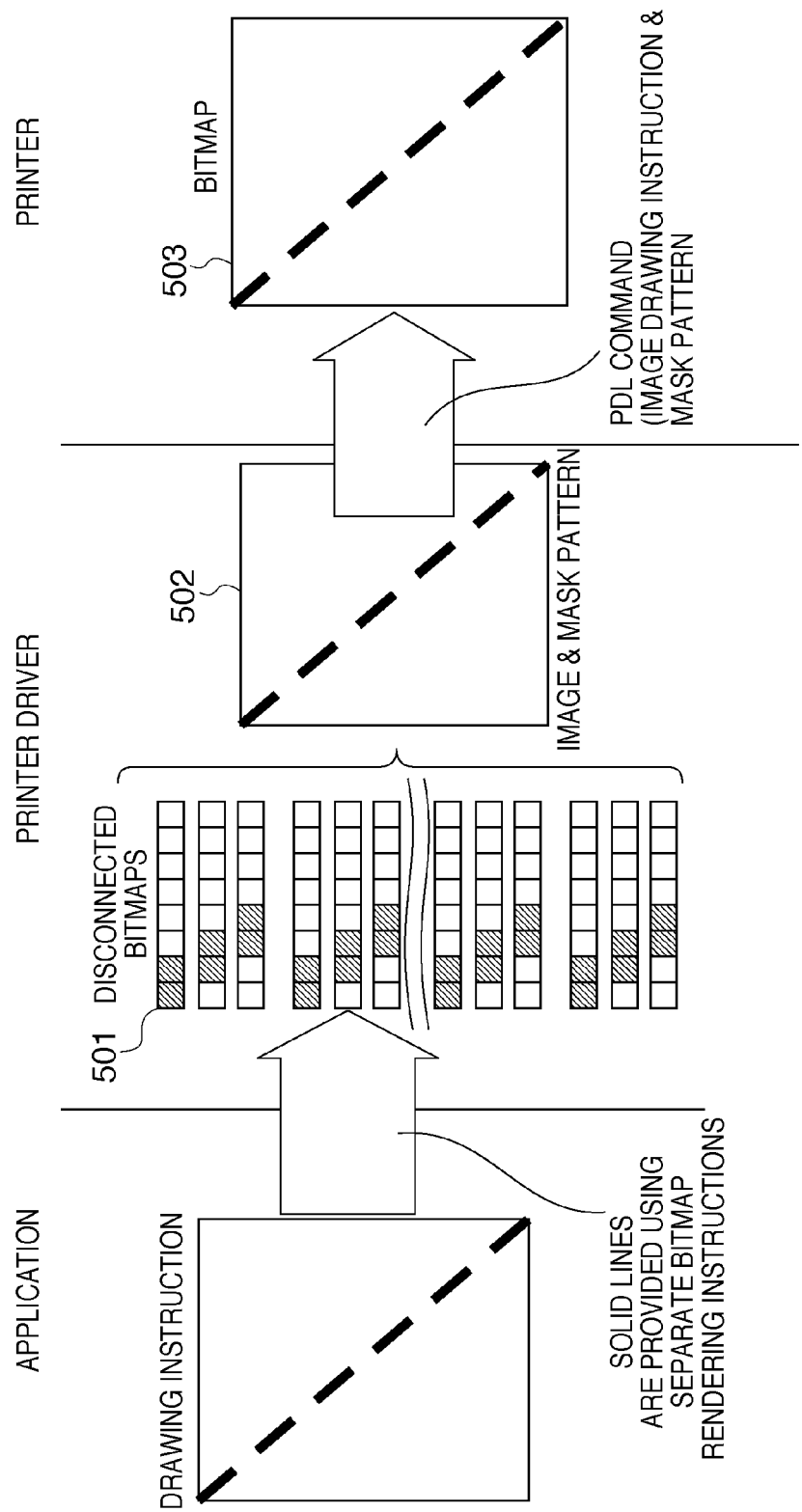
FIG. 6 is a conceptual diagram showing a second problem with the conventional image composition method.

FIG. 6 shows an example in which a slope dotted line, which is one example of disconnected images, is printed. In the example shown in FIG. 6, the concept of combination and conversion into an image and mask shown in FIG. 5 is extended to a slope dotted line without modification and, as a result, the amount of data in rendering using PDL drawing commands becomes large as compared with the amount of data rendered as bitmaps.

When the range of images to be combined is extended without modification to the combining process shown in FIG. 5 and disconnected images 501 shown in FIG. 6 are combined, an image larger than the sum of the source images as shown in part 502 is likely to result (see also FIG. 11). There is no advantage in combining images to draw an image as shown in part 503 in this way because the time for transmitting data from the PC to the printer increases.

Therefore, according to the present invention, a specific combining condition is added to the processing in FIG. 5 to solve the problem with the example in FIG. 6.

(Example of Processing of a Slope Dotted Line According to the Invention)

Figure 7:
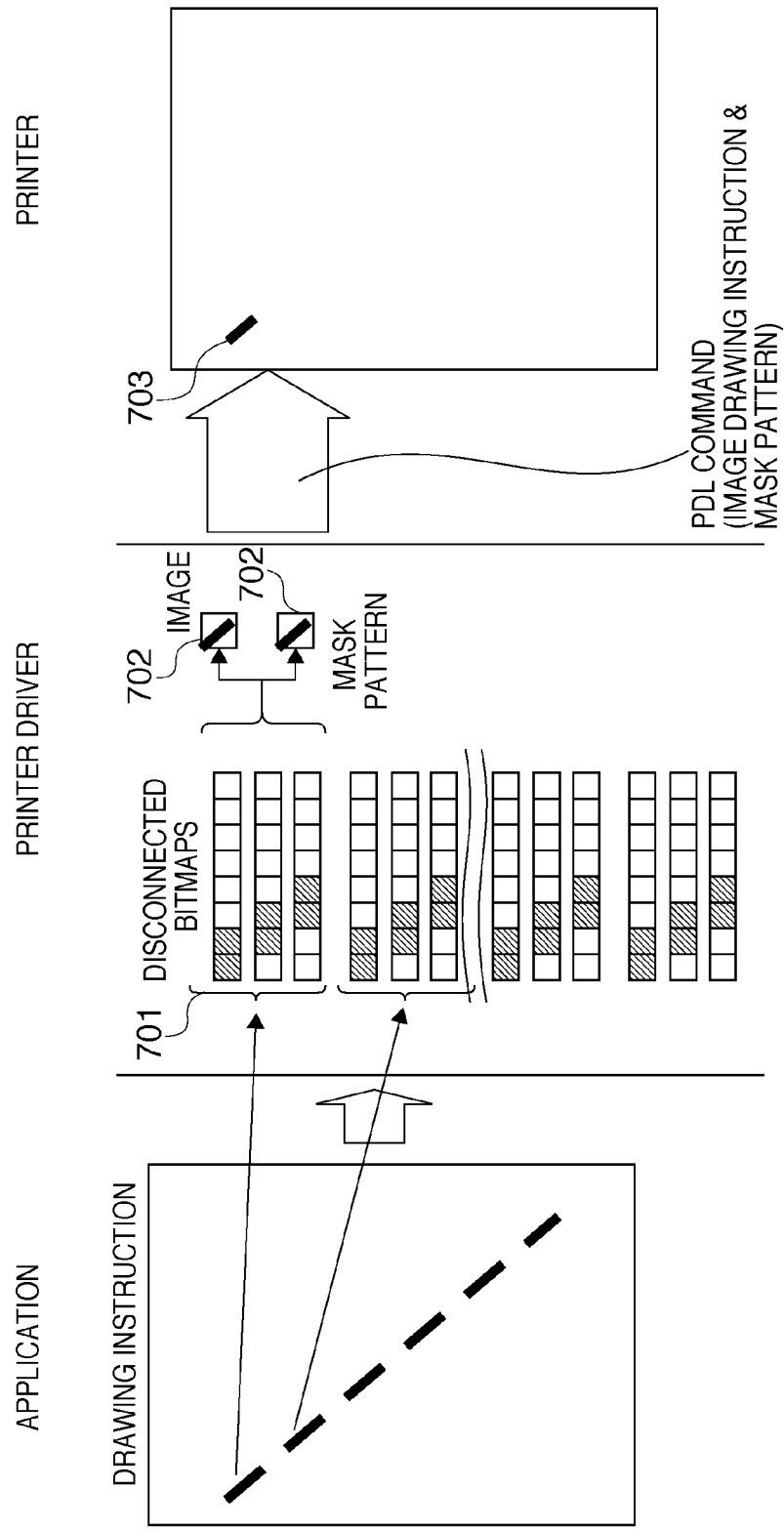
FIG. 7 is a conceptual diagram showing processing according to the present invention that solves the second problem with the conventional image composition method shown in FIG. 6.

FIG. 7 shows an example in which a slope dotted line, which is one example of disconnected images, is printed according to the present invention. In the example shown in FIG. 7, a specific combining condition is added to perform the process in FIG. 5, the problem with the example in FIG. 6 is solved, and the amount of data in rendering using PDL drawing commands is reduced as compared with the amount of data rendered as bitmaps.

In FIG. 7, only optimum drawing instructions in disconnected images 701 are combined to generate a PDL drawing command 702 (including an image and a mask). As shown in drawing in part 703 of FIG. 7, images transferred for a single solid line of the dotted line are combined whereas images apart from each other are not combined, on the basis of a specific combining condition.

A mask pattern is generated in order to indicate the portion of a rectangle bitmap that is to be processed on a printer.

<Exemplary Configurations of Drawing Instruction and Combination Data Table in the Present Embodiment>

For purposes of illustration of a combining condition in the exemplary embodiment, an image drawing process performed in a printer driver will be described using Windows (registered trademark) as an example with reference to FIGS. 8 and 9.

(Exemplary Configuration of Drawing Instruction)

Figure 8:
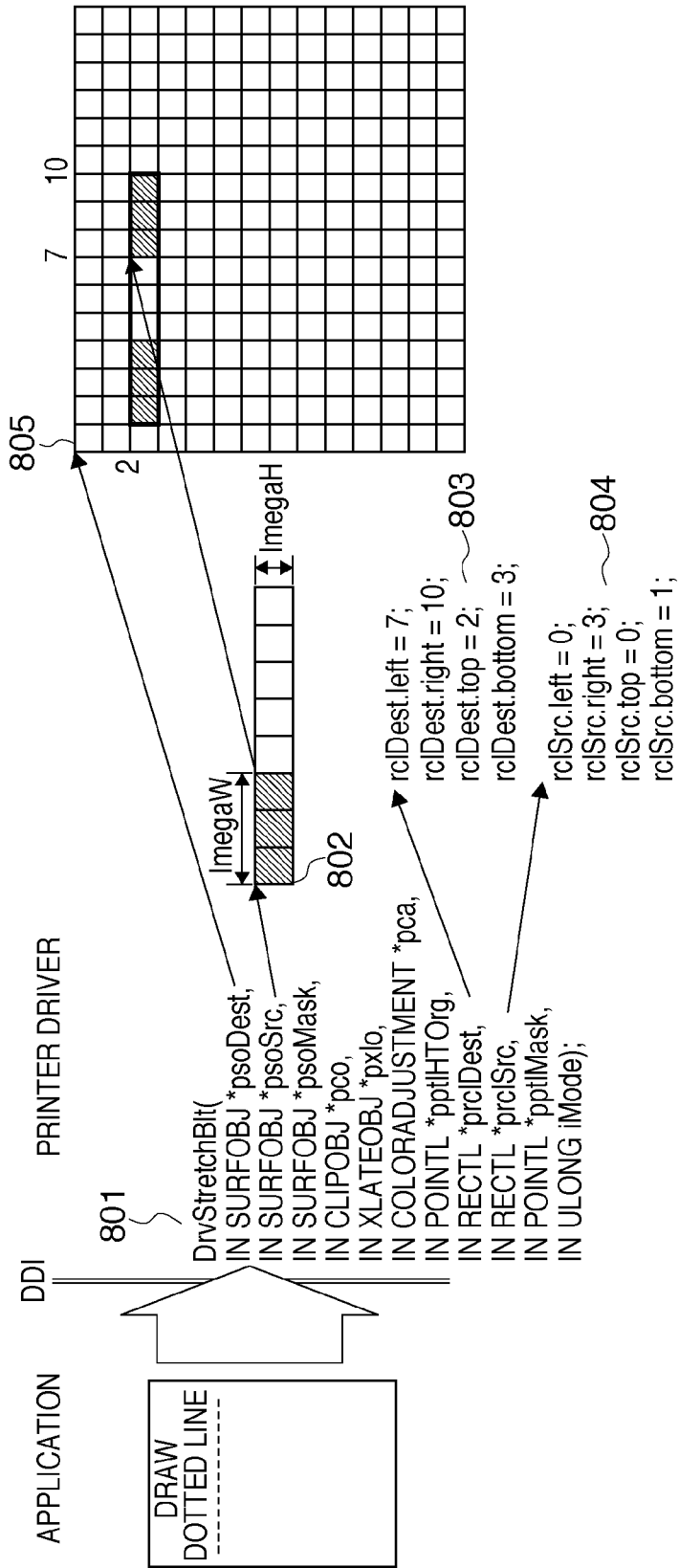
FIG. 8 is a diagram illustrating image information received by a Windows printer driver from an OS in the exemplary embodiment.

FIG. 8 shows an example in which a dotted line drawing generated on an application is transferred to the DrvStretch-Blt function 801, which is a DDI function of a Windows-based printer driver, as an instruction to draw an image of several pixels.

In the example in FIG. 8, a "prclSrc" area 804 in a bitmap memory space 802 indicated by "psoSrc" is drawn in a "prclDest" area 803 in a bitmap memory space 805 indicated by "psoDest". The structure RECTL of the "prclDest" area 804 and "prclDest" area 803 can represent the positions in a rectangular area as follows:

typedef struct _RECTL {
　　LONG left;
　　LONG top;
　　LONG right;
　　LONG bottom;
} RECTL, *PRECTL;

In addition, there are other elements such as "psoMask" which indicates a mask area using on-pixels in a bitmap and "pco" which indicates a clipping area, description of which will be omitted here. A drawing instruction formed with a drawing bitmap and a mask pattern is a command to draw a masked portion of a mask pattern on a drawing bitmap. Alternatively, a drawing instruction includes a command to clear a masked portion of a mask pattern and a command to draw a bitmap in which an unmasked portion of the mask pattern is cleared, by using OR operation.

Here, "left" and "right" indicate drawing positions where the leftmost position in the horizontal directions is 0 whereas "top" and "bottom" indicate drawing positions where the top position in the vertical directions is 0.

(Exemplary Configuration of Combination Data Table)

A storage format of image data in combination data table form for intermediate data stored in the memory buffer 306 will be described next with reference to FIG. 9.

"rclUniImgArea" 901 stores the most-outer circumscribed rectangle area of an image resulting from combination of intermediate data stored in the memory buffer 306.

"UniImagAreaSize" 902 is the data size of a generated image in "rclUniImageArea" 901.

"TotalSrcImageSize" 903 is the total of the sizes of individual images stored and can be obtained according to the following equations:

$$ImageW=\text{rclDest.right}-\text{rclDest.left};$$

$$ImageH=\text{rclDest.bottom}-\text{rclDest.top};$$

$$TotalSrcImageSize=\Sigma(ImageW \times ImageH);$$

"rop" 904 contains a logical value specified in image drawing instructions stored. When the memory buffer 306 contains disconnected images, it is determined that images that have a rop value different from the stored rop value cannot be combined.

"ImgCnt" 907 indicates the number of images stored.

"plstimgtable" 908 stores the start address of an image data structure stored. "plastimgtable" 912 represents a pointer to the last image data structure stored.

The components 901 to 908 and 912 constitute a general management table 910 for managing whole images stored.

The image data structure 911 stored includes the following data: source image area information "rclSrc" 905, rendering area information "rclDst" 909, and a drawing destination area of the size of image data body size "ImageSize" 906. "ImageData" contains the image data body.

Figure 9:
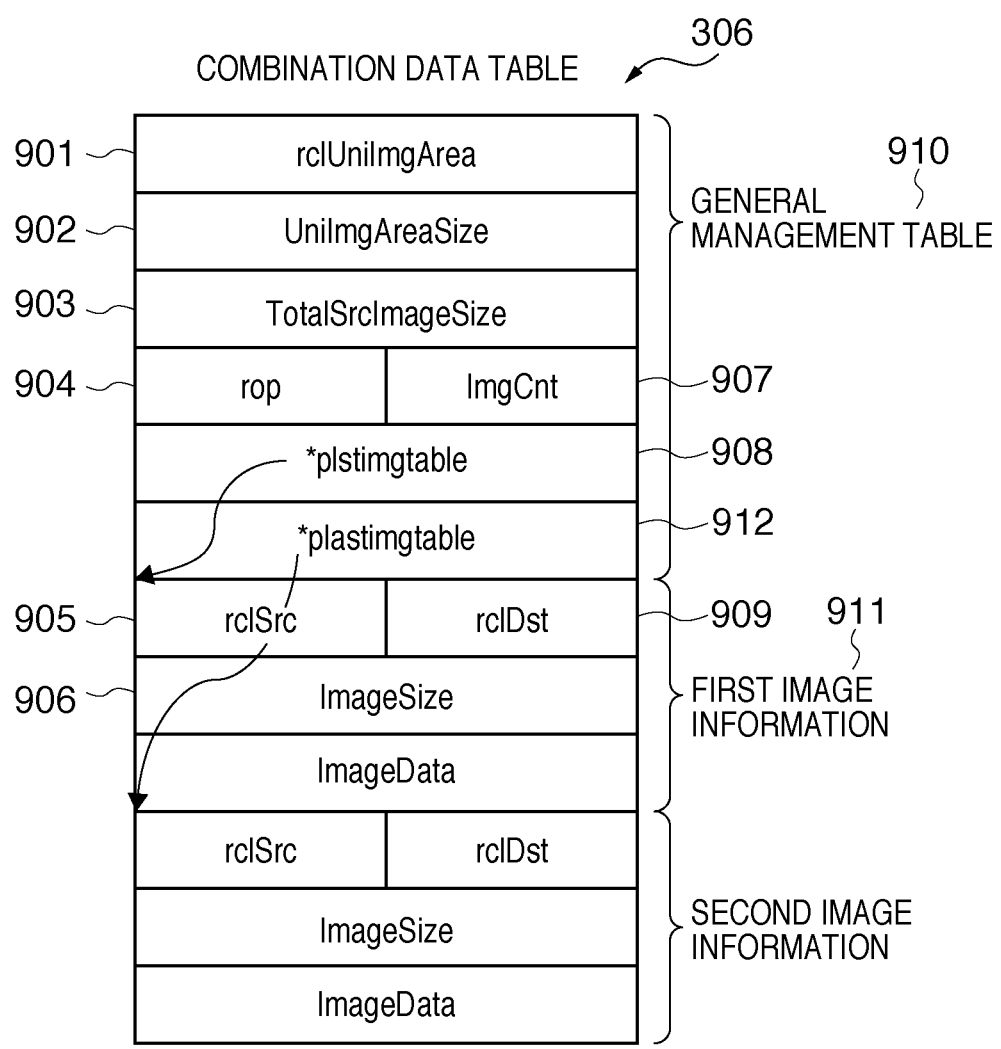
FIG. 9 shows an exemplary configuration of combination data table according to the exemplary embodiment.

As shown in FIG. 9, multiple image data structures 911 (first and second image information are shown in FIG. 9) can be stored in series in a single management table 910.

<Exemplary Criterion for Determining Whether to Combine Images According to the Exemplary Embodiment>

In the exemplary embodiment, upon reception of image data from the OS, Formula A given below is executed in order to quickly determine whether combining the image will increase processing speed. If the result is logically true, it is determined that combination should be performed; if logically false, it is determined that combination should not be performed.

$$(ImageW \times ImageH \times \text{bitspixel} < \text{maxSize}) \,\&\, (TotalSrcImageSize/UniImgAreaSize \times 100 > MinimumOccupationRatio) \quad \text{(Formula A)}$$

Here, "bitspixel" is the number of bits representing one pixel and "maxSize" is a first threshold (constant) for combining only disconnected images. In the exemplary embodiment, when a reduced image is to be generated, the resolution of the original image is reduced to an output resolution by the printer driver and when an enlarged image is to be generated, the original image is enlarged on the printer. Accordingly, if a bitmap size obtained from the rclDest area is smaller than the threshold, the image is processed as a disconnected image. The first threshold varies from one print processing system to another.

"MinimumOccupationRatio" is a second threshold (constant) for ensuring that the ratio of the area of an image to a combined image is greater than a certain value so that an unused area in the combined image does not increase. The second threshold also varies from one print processing system to another.

Formula A for the determination given above and the thresholds are not limitative but can be changed without departing from the present invention.

<Example of Processing by Print Processing Method According to the Exemplary Embodiment>

Disconnected image combination according to the exemplary embodiment will be simulated below with respected to FIGS. 10 to 12. It is assumed in the exemplary embodiment that maxSize=80 bytes and MinimumOccupationRatio=20%. However, these values vary from one print processing system to another.

(Example of Processing of a Horizontal Dotted Line)

Figure 10:
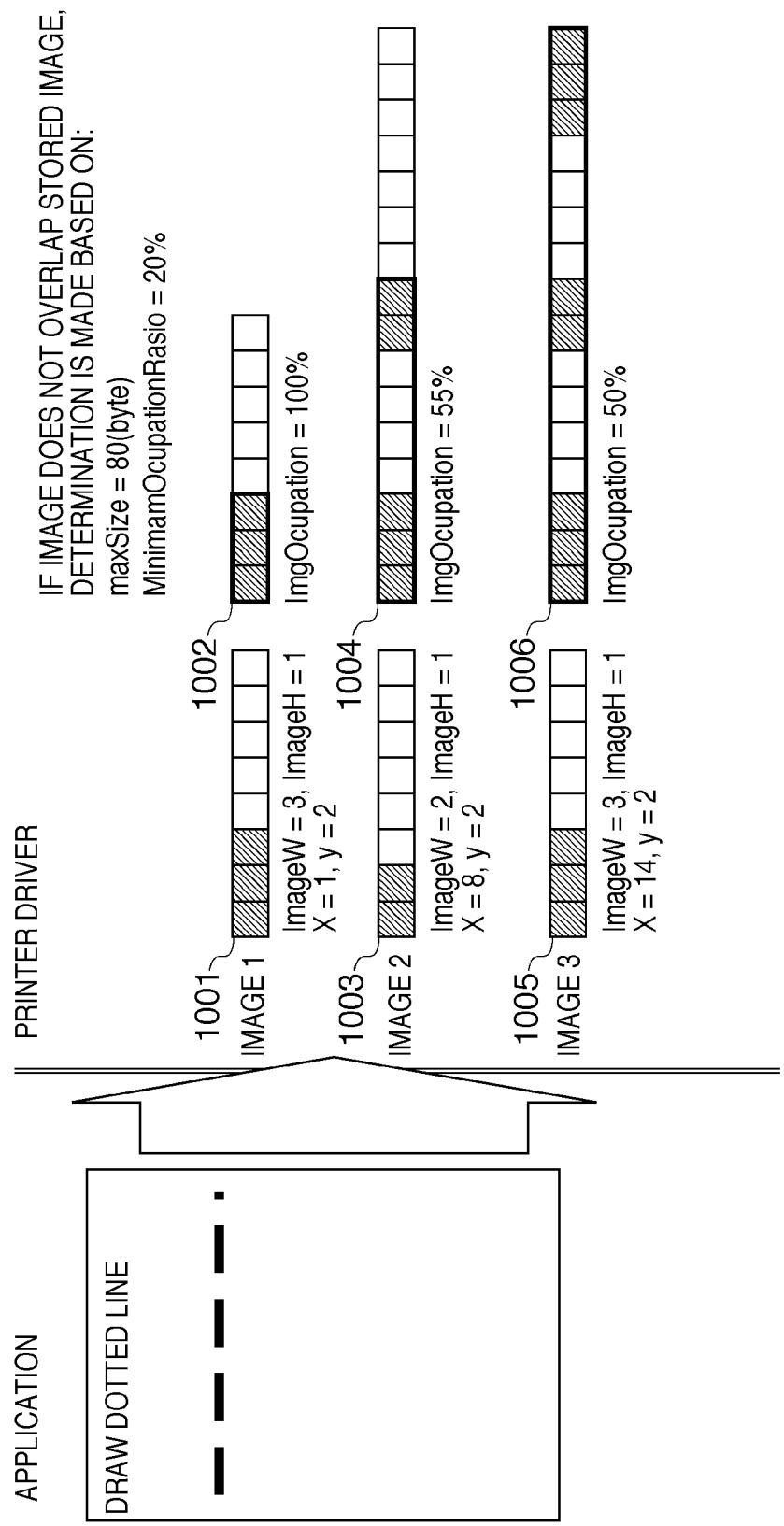
FIG. 10 is a diagram illustrating a flow of image data when a horizontal dotted line is composed according to the exemplary embodiment.

FIG. 10 shows an example of processing of a dotted line by a print processing method according to the exemplary embodiment.

Image 1 (1001) (ImageW=3, ImageH=1, bitspixel=1, and drawing position is (X=1, y=2)) meets the combining conditions expressed by Formula A and therefore is stored in a memory buffer as an image to be combined. Here, ImgOccupation=100% because only the image is stored in the memory buffer. Part 1002 shows image 1 stored in the memory buffer and rendered as a bitmap.

The next image 2 (1003) (ImageW=2, ImageH=1, bitspixel=1, and drawing position is (x=8, y=2)) provided from the OS also meets the combining conditions expressed by Formula A. Because image 2 does not overlap image 1 and ImgOccupation=55%, which meets the condition, image 2 is stored in the memory buffer as an image combined. Part 1004 shows the combined image (images 1 and 2) stored in the memory buffer and rendered as a bitmap.

Similarly, image 3 (1005) is determined to be combinable because ImgOccupation=50%. Therefore, image 3 is also stored in the memory buffer. Part 1006 shows the combined image (images 1, 2, and 3) stored in the memory buffer and rendered as a bitmap.

(Example of Processing of Slope Dotted Line)

FIG. 11 shows an example of processing of a slope dotted line by the print processing method according to the exemplary embodiment.

In the example in FIG. 11, image 1 (1101), image 2 (1103), and image 3 (1105) are determined to be combinable because ImgOccupation=50%. Parts 1102, 1104, and 1106 show combined images rendered as bitmaps.

However, if image 4 (1107) were combined, the combined image would appear as shown in part 1108 and ImgOccupation=17%, which is lower than a threshold of 20%. This does not satisfy Formula A and therefore image 4 (1107) is not combined. It is shown that images 1 (1101) to images 3 (1105) are combined to generate a PDL drawing command.

After the PDL command for the combined image is issued, the memory buffer 306 is cleared and image 4 (1107) is stored in the image buffer 306 for the subsequent combination.

By continuing the process, the process shown in FIG. 7 is accomplished.

(Example of Application to Other Noncontiguous Images)

Figure 12:
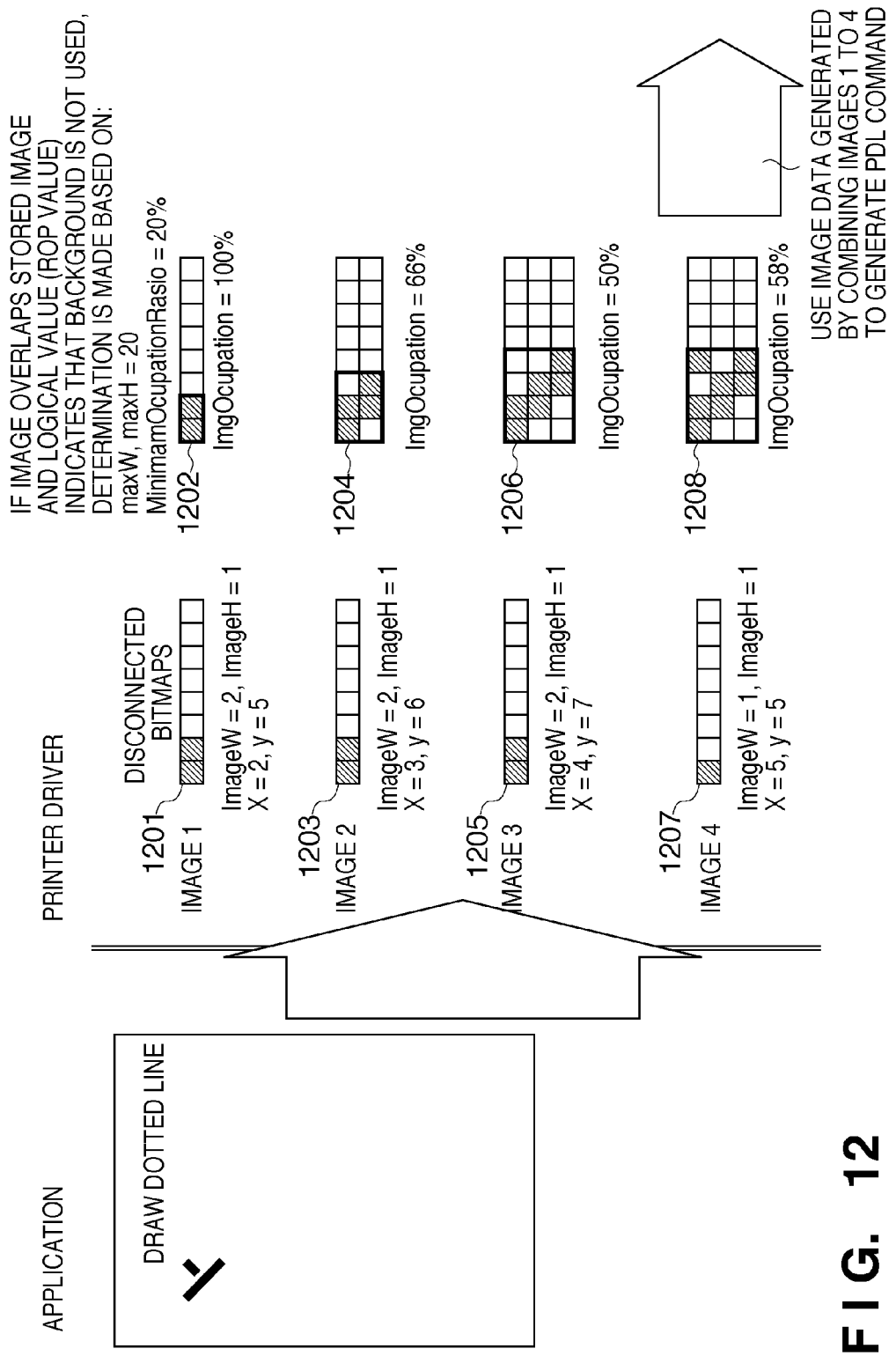
FIG. 12 is a diagram illustrating a flow of image data when another disconnected image is composed according to the exemplary embodiment.

FIG. 12 shows an example of application of the exemplary embodiment to noncontiguous images dissimilar to a horizontal dotted line (FIG. 10) and a slope dotted line (FIG. 11).

In the example in FIG. 12, image 1 (1201) to image 3 (1205) are the same as those in FIG. 11. Accordingly, parts 1202 to 1206 are the same as parts 1102 to 1106 of FIG. 11.

The drawing area of the next image 4 (1207) in FIG. 12 overlaps the most-outer circumscribed rectangle area rclUniImgArea of images 1 to 3 (1205).

If the drawing instructions for images 1 to 3 are instructions to draw overlying images without using an underlying background, it is determined that the images can be combined. Furthermore, if image 4 (1207) is combined, ImgOccupation will be 58%. Therefore, it is determined that image 4 (1207) can be combined. Image 4 (1207) is combined and is stored in the memory buffer 306. Part 1208 shows the combined image (images 1, 2, 3 and 4) stored in the memory buffer and rendered as a bitmap.

<Example of Procedure of Print Processing Method According to the Exemplary Embodiment>

Figure 13:
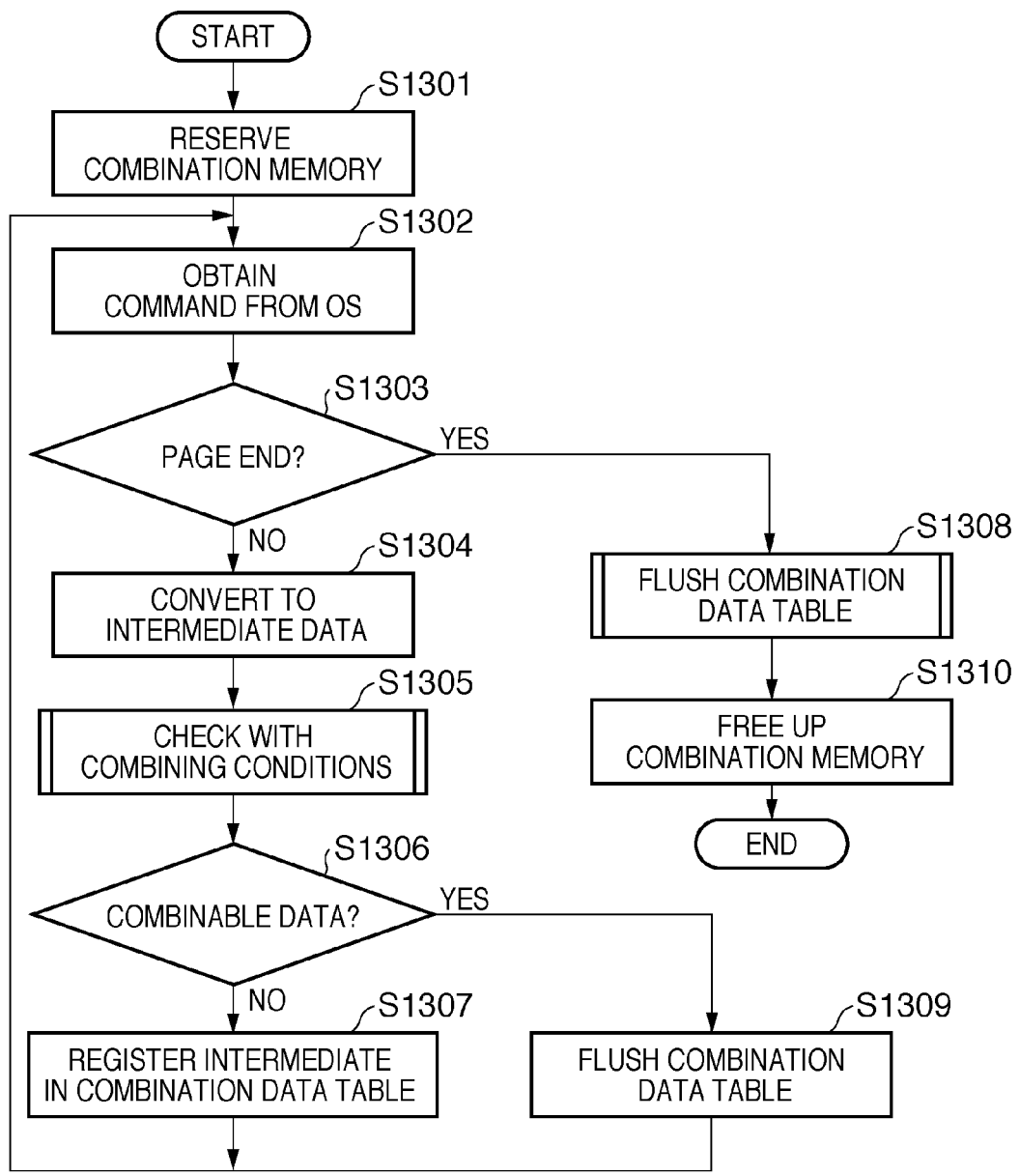
FIG. 13 is a flowchart showing an exemplary procedure of a print processing method by a printer driver for an information processing apparatus according to the exemplary embodiment.
Figure 14:
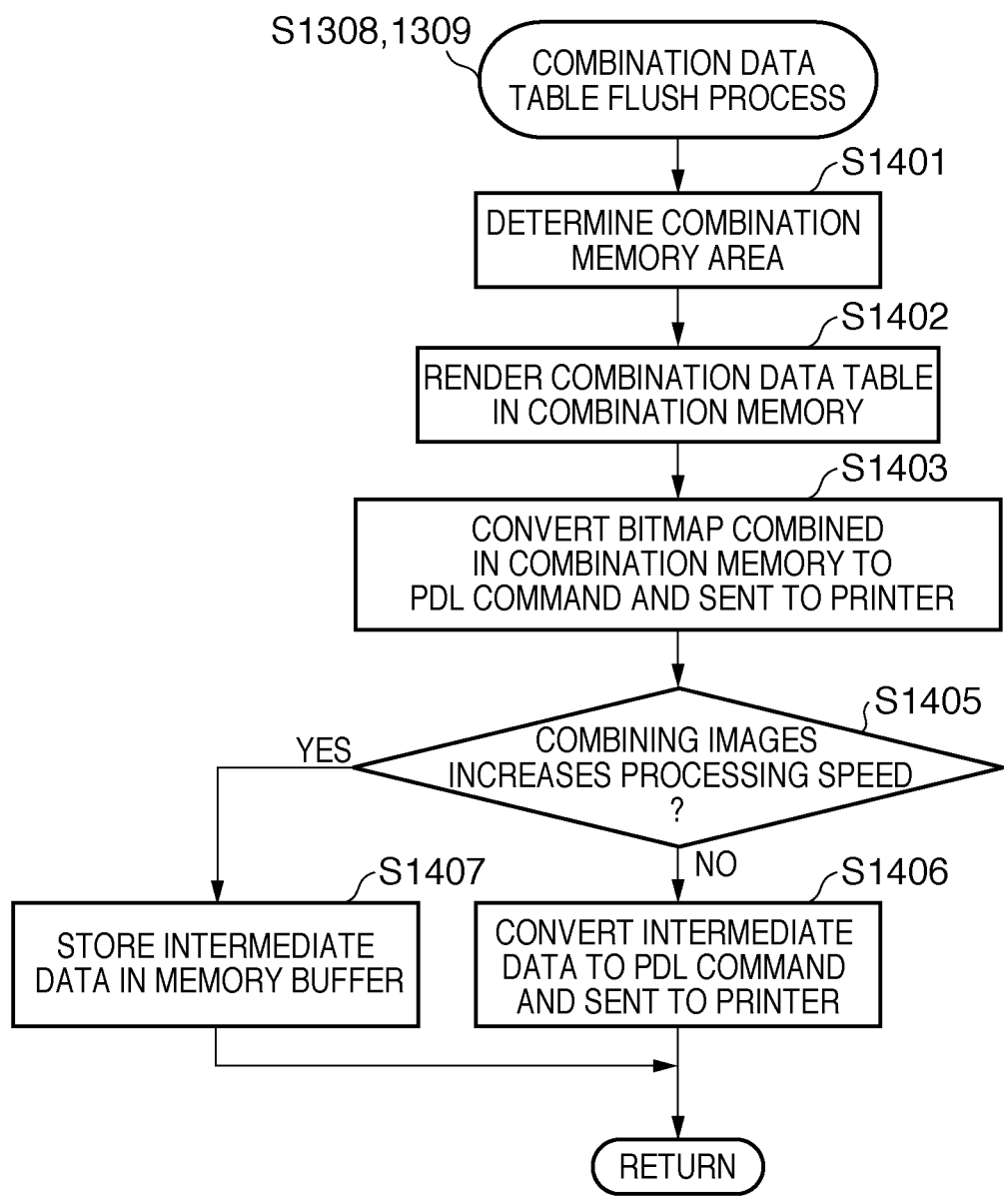
FIG. 14 is a flowchart showing an exemplary procedure of combination data table flush processing shown in FIG. 13.
Figure 15:
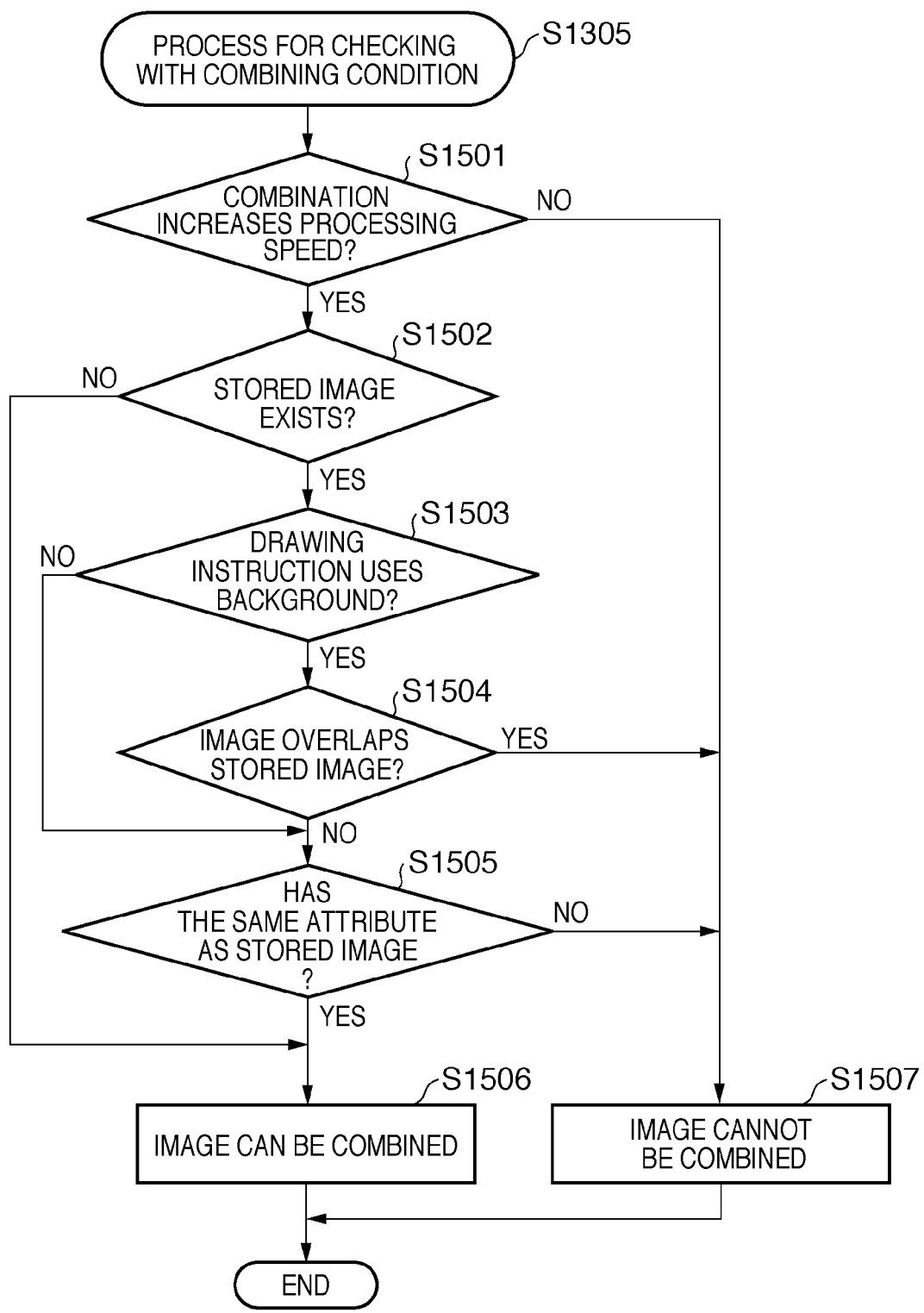
FIG. 15 is a flowchart showing an exemplary procedure of combining condition determination processing shown in FIG. 13.

FIGS. 13, 14, and 15 are flowcharts showing an exemplary flow of the processing performed by the printer driver 303 described above. In practice, the process by the printer driver 303 is executed by the central processing unit 101 in accordance with the process procedure of the printer driver 303. However, the expression "the printer driver 303 does" will be used in the following description.

(Example of Whole Process Procedure)

The whole process of a pint processing method by the printer driver according to the present invention will be described with reference to the flowchart of FIG. 13.

Before an initialization message is provided to the printer driver, the following process is performed.

First, an instruction to execute printing is input from the input unit 104 shown in FIG. 1. In response to the instruction, an OS 301, among OSs, drivers and applications (FIG. 2) loaded in the main storage unit 102 from the auxiliary storage unit 103, receives the message. The OS 301 sends a print execution message to a currently active application 302.

The application 302 converts the message to a command recognizable to the OS 301 and sends the data to be printed and the command message to the OS 301. The OS 301 converts the command message to a command recognizable to the printer driver 303 and sends the message to the printer driver 303.

Upon receiving the initialization message, the printer driver 303 starts the process of the flowchart in FIG. 13. The printer driver 303 first allocates and clears a memory buffer 306 for storing combination data table and a combination memory 308 used for combining images, as initialization (step S1301).

The printer driver 303 obtains and analyzes a command sent from the OS (step S1302). At step S1303, the printer driver 303 detects a page-end command from the result of the analysis. If the command is a page-end command, the printer driver 303 proceeds to step S1308, otherwise, to step S1304.

The printer driver 303 converts the command to intermediate data at step S1304 and checks with combining conditions at step S1305 (which will be described later in detail with reference to FIG. 15). At step S1306, the printer driver 303 determines on the basis of the result of checking at step S1305 whether the intermediate data can be combined. If the intermediate data can be combined, the printer driver 303 proceeds to step S1307. The printer driver 303 stores the image information in the combination data table in the memory buffer 306 along with the image at step S1307, then returns to step S1302, where the printer driver 303 waits for the next instruction.

On the other hand, if the printer driver 303 determines at step S1306 that the intermediate data cannot be combined, the printer driver 303 proceeds to step S1309. At step S1309, the printer driver 303 performs a flush process (which will be described later in detail with reference to FIG. 14), then returns to step S1302 to obtain the next instruction.

If the printer driver 303 determines at step S1303 that it has received a page-end command, the printer driver 303 flushes the combination data table at step S1308 (which will be described later in detail with reference to FIG. 14). At step S1310, the printer driver 303 frees up the memories allocated at step S1301 and will end the process.

(Example of Procedure of Combination Data Table Flush Process)

FIG. 14 is a flowchart of the combination data table flush process performed at steps S1308 and S1309 of FIG. 13.

At step S1401, the printer driver 303 uses the value of rclUniImageArea in the combination data table in the memory buffer 306 to allocate a bitmap area in the combination memory 308 that is required for combination. At step S1402, the printer driver 303 renders the image information 911 registered in the combination data table in the bitmap area allocated in the combination memory 308 in the order of registration. At step S1403, the printer driver 303 generates a PDL command from the bitmap data combined on the combination memory 308 and sends the PDL command to the printer.

If the printer driver 303 determines at step S1405 that the intermediate data currently being processed is image data that, if combined, increases processing speed, the printer driver 303 proceeds to step S1407; otherwise, the printer driver 303 proceeds to step S1406.

At step S1406, the printer driver 303 converts the intermediate data being processed to a PDL command and sends the PDL command to the printer. At step S1407, on the other hand, the printer driver 303 stores the intermediate data in the memory buffer 306.

Then the printer driver 303 ends the combination data table flush process and returns.

(Example of Procedure of Combining Condition Checking Process)

FIG. 15 is a flowchart of the process for checking with combining conditions performed at step S1305 of FIG. 13.

At step S1501, the printer driver 303 determines on the basis of Formula A whether combining into the image will increase the processing speed. If the printer driver 303 determines that combining into the image will increase processing speed, the printer driver 303 proceeds to step S1502; otherwise, the printer driver 303 proceeds to step S1507.

At step S1502, the printer driver 303 determines whether there is image data stored in the combination data table in the memory buffer 306. If image data is stored, the printer driver 303 proceeds to step S1503; otherwise, the printer driver 303 proceeds to step S1506.

At step S1503, the printer driver 303 checks the drawing attribute of the drawing instruction to determine whether the drawing instruction uses a background. If the drawing instruction uses a background, the printer driver 303 proceeds to step S1504; otherwise, the printer driver 303 proceeds to step S1505.

At step S1504, the printer driver 303 checks the drawing instruction being processed to determine whether the image overlap a stored image. If the image does not overlap, the printer driver 303 proceeds to step S1505. If the image overlap, the image cannot be combined and therefore the printer driver 303 proceeds to step S1507.

At step S1505, the printer driver 303 determines whether the drawing attribute (such as a rop value or CLIP value) of the image is the same as that of the stored image. If the attribute is the same, the printer driver 303 proceeds to step S1506; otherwise, the printer driver 303 proceeds to step S1507.

At step S1506, the printer driver 303 determines that the image can be combined. At step S1507, on the other hand, the printer driver 303 determines that the image cannot be combined. For example, the printer driver 303 stores a flag in an area reserved in the main storage unit 102.

In summary, the conditions for combining an image is: (1) there is not a stored image, (2) there is a stored image, a background is not used, and the attribute of the image is the same as that of the stored image; or (3) there is a stored image, a background is used but the image does not overlap, and the attribute is the same. If none of the three conditions are met, it is determined that the image cannot be combined.

In this way, each time the printer driver receives a drawing instruction from the OS, the printer driver determines whether the received drawing instruction should be combined, and then stores intermediate data. If the printer driver receives a drawing instruction that does not meet any of the combining conditions, the printer driver combines and draws the intermediate data stored up to that point in the bitmap space. A print instruction is generated from the bitmap combined and drawn and is immediately sent to the printer. Therefore, the process can be performed concurrently with processing on the printer.

While commands converted by the printer driver from drawing instructions or intermediate data transferred from the OS and sent to the printer are PDL drawing commands in the foregoing description, the commands do not necessarily need to be PDL drawing commands. For example, the commands may be device-independent drawing commands or drawing instructions transferred from the OS without conversion. The present invention is applicable to such cases as well and has the same effects.

The present invention may be applied to a system or integrated apparatus including multiple devices (such as a host computer, an interface device, and a printer) or to an apparatus formed by a single device.

It will be understood that the object of the present invention can also be achieved by providing a storage medium (or a recording medium) on which a software program code that implements the functions of any of the exemplary embodiments described above is recorded to a system or apparatus to cause the computer (CPU or MPU) of the system or apparatus to read and execute the program code recorded on the medium.

In this case, the program code read from the storage medium implements the functions of any of the exemplary embodiments described above and the storage medium on which the program code is recorded constitutes the present invention.

The functions of any of the exemplary embodiments can be implemented not only by a computer reading and executing the program code. Of course, the present invention also includes an implementation in which an operating system (OS) running on a computer performs part or all of actual processing in accordance with instructions in the program code and the processing implements the functions of any of the exemplary embodiments described above.

The present invention also includes an implementation in which the program code read from a storage medium is written on a memory provided in a function expansion card inserted in a computer or a function expansion unit connected to a computer, then a CPU or other processor provided in the function expansion card or the function expansion unit performs part or all of actual processing in accordance with instructions in the program code and the processing implements the functions of any of the exemplary embodiments described above.

If the present invention is applied to the storage medium, program codes corresponding to the flowcharts described above are stored on the storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-259238, filed Oct. 2, 2007, which is hereby incorporated by reference herein in its entirety.

What is claimed is:

1. An image processing apparatus comprising:
   an obtaining unit configured to obtain a first drawing instruction for drawing a first image and a second drawing instruction for drawing a second image, the first drawing instruction being an instruction for drawing the first image, after the second image is drawn, on an area overlapping an area where the second image is drawn;
   a determination unit configured to determine whether the first image hides an image being already drawn on an area where the first image is drawn;
   an outputting unit configured to draw an image by drawing the second image, and then the first image on the second image, and to output the drawn image to a printer unit if the determination unit determines that the first image hides an image being already drawn, and to output the first instruction and the second instruction to the printer unit if the determination unit determines that the first image does not hide an image being already drawn.

2. The image processing apparatus according to claim 1, wherein the determination unit determines that the first image hides an image being already drawn if the first image is drawn by overwriting an image being already drawn.

3. The image processing apparatus according to claim 1, wherein the determination unit determines that the first image does not hide an image being already drawn if the first image is drawn so that an image being already drawn on an area overlapping an area where the first image is drawn is visible.

4. The image processing apparatus according to claim 3, wherein the second image is drawn so that an image being already drawn on an area overlapping an area where the second image is drawn is visible.

5. The image processing apparatus according to claim 1, wherein the first instruction and the second instruction output to the printer unit by the outputting unit are used by the printer unit to draw the first image, after the second image is drawn, on an area overlapping an area where the second image is drawn.

6. The image processing apparatus according to claim 1, wherein each size of the first image and the second image is smaller than a predetermined size.

7. The image processing apparatus according to claim 1, wherein the outputting unit is further configured to output one or more PDL commands converted from the drawn image or the first and the second instructions.

8. The image processing apparatus according to claim 1, wherein the outputting unit is further configured to:
generate a PDL command on the basis of the drawn image and output the generated PDL command to the printer unit if the determination unit determines that the first image hides an image being already drawn; and
convert the first instruction and the second instruction into PDL commands and output the converted PDL commands to the printer unit if the determination unit determines that the first image does not hide an image being already drawn.

9. The image processing apparatus according to claim 1, wherein the printer unit is provided in a printer which is different from the information processing apparatus.

10. An image processing method comprising the steps of:
obtaining a first drawing instruction for drawing a first image and a second drawing instruction for drawing a second image, the first drawing instruction being an instruction for drawing the first image, after the second image is drawn, on an area overlapping an area where the second image is drawn;
determining whether the first image hides an image being already drawn on an area where the first image is drawn;
drawing an image by drawing the second image, and then the first image on the second image and outputting the drawn image to a printer unit if the determining step determines that the first image hides an image being already drawn; and
outputting the first instruction and the second instruction to the printer unit if the determining step determines that the first image does not hide the image being already drawn.

11. The image processing method according to claim 10, wherein the determining step determines that the first image hides an image being already drawn if the first image is drawn by overwriting an image being already drawn.

12. The image processing method according to claim 10, wherein the determining step determines that the first image does not hide an image being already drawn if the first image is drawn so that an image being already drawn on an area overlapping an area where the first image is drawn is visible.

13. The image processing method according to claim 12, wherein the second image is drawn so that an image being already drawn on an area overlapping an area where the second image is drawn is visible.

14. The image processing method according to claim 10, wherein the first instruction and the second instruction output to the printer unit by the outputting are used by the printer to draw the first image, after the second image is drawn, on an area overlapping an area where the second image is drawn.

15. The image processing method according to claim 10, wherein each size of the first image and the second image is smaller than a predetermined size.

16. The image processing method according to claim 10, wherein the outputting step outputs one or more PDL commands converted from the drawn image or the first and the second instructions.

17. The image processing method according to claim 10, wherein the outputting steps comprises the steps of:
generating a PDL command on the basis of the drawn image and outputting the generated PDL command to the printer unit if the determining step determines that the first image hides an image being already drawn; and
converting the first instruction and the second instruction into PDL commands and outputting the converted PDL commands to the printer unit if the determining step determines that the first image does not hide an image being already drawn.

18. The image processing method according to claim 10, wherein the printer unit is provided in a printer which is different from an apparatus performing the image processing method.

19. A non-transitory computer-readable storage medium storing a computer-executable program for causing an information processing apparatus to function as:
an obtaining unit configured to obtain a first drawing instruction for drawing a first image and a second drawing instruction for drawing a second image, the first drawing instruction being an instruction for drawing the first image, after the second image is drawn, on an area overlapping an area where the second image is drawn;
a determination unit configured to determine whether the first image hides an image being already drawn on an area where the first image is drawn;
an outputting unit configured to draw an image by drawing the second image, and then the first image on the second image, and to output the drawn image to a printer unit if the determination unit determines that the first image hides an image being already drawn, and to output the first instruction and the second instruction to the printer unit if the determination unit determines that the first image does not hide an image being already drawn.

20. The non-transitory computer-readable storage medium according to claim 19, wherein the determination unit determines that the first image hides an image being already drawn if the first image is drawn by overwriting an image being already drawn.

21. The non-transitory computer-readable storage medium according to claim 19, wherein the determination unit determines that the first image does not hide an image being already drawn if the first image is drawn so that an image being already drawn on an area overlapping an area where the first image is drawn is visible.

22. The non-transitory computer-readable storage medium according to claim 21, wherein the second image is drawn so that an image being already drawn on an area overlapping an area where the second image is drawn is visible.

23. The non-transitory computer-readable storage medium according to claim 19, wherein the first instruction and the second instruction output to the printer unit by the outputting unit are used by the printer unit to draw the first image, after the second image is drawn, on an area overlapping an area where the second image is drawn.

24. The non-transitory computer-readable storage medium according to claim 19, wherein each size of the first image and the second image is smaller than a predetermined size.

25. The non-transitory computer-readable storage medium according to claim 19, wherein the outputting unit is further configured to output one or more PDL commands converted from the drawn image or the first and the second instructions.

26. The non-transitory computer-readable storage medium according to claim 19, wherein the outputting unit is further configured to:
  generate a PDL command on the basis of the drawn image to a PDL command, and output the generated PDL command to the printer unit if the determination unit determines that the first image hides an image being already drawn; and
  convert the first instruction and the second instruction into PDL commands and output the converted PDL commands to the printer unit if the determination unit determines that the first image does not hide an image being already drawn.

27. The non-transitory computer-readable storage medium according to claim 19, wherein the printer unit is provided in a printer which is different from the information processing apparatus.

* * * * *